May 23, 1933. L. X. GARFUNKEL 1,911,017
MACHINE FOR SHAPING PLASTIC MATERIAL
Filed Sept. 17, 1931 4 Sheets-Sheet 3

INVENTOR
Louis X. Garfunkel
BY
ATTORNEY

May 23, 1933.    L. X. GARFUNKEL    1,911,017
MACHINE FOR SHAPING PLASTIC MATERIAL
Filed Sept. 17, 1931    4 Sheets-Sheet 4

INVENTOR.
Louis X. Garfunkel
BY
ATTORNEY

Patented May 23, 1933

1,911,017

UNITED STATES PATENT OFFICE

LOUIS X. GARFUNKEL, OF NEW YORK, N. Y.

MACHINE FOR SHAPING PLASTIC MATERIAL

Application filed September 17, 1931. Serial No. 563,300.

This invention relates to machines for shaping plastic material and is particularly directed to the type of machine shown and described in my co-pending application Serial No. 558,735, filed on the 22 day of August, 1931, it being an object of my invention to generally improve and simplify a machine of this character, to make same highly practical, economical and efficient.

A further object of this invention is to provide in a machine of the character described, highly improved means for adjusting the thickness of the molded cakes, the construction including means for indicating the number of cakes formed per pound of plastic material used.

Still another object of this invention is to provide in a machine of the character described adjustable means for automatically stopping the machine after a desired number of cakes have been molded.

Another object of this invention is to provide in a machine of the character described, an improved hopper for the plastic material to be molded, having provision for maintaining the plastic material cold, whereby food materials may be retained within the hopper for longer periods than heretofore.

Still another object of this invention is to provide in a machine of the character described, highly improved and efficient means for removing the molded cakes from the molding machine.

A still further object of this invention is to provide a neat, compact and rugged machine of the character described having comparatively few and simple parts, which shall be easy to manufacture, simple to assembly and disassemble, which shall be smooth and positive in operation, easy to manipulate and adjust, and which shall be attractive in appearance, safe to use, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention.

Referring now in detail to the drawings, 10 designates a machine embodying the invention for forming shaped or molded articles, here shown in the form of a device for molding plastic or comminuted material to form cakes such as Hamburger steaks, fish balls, croquettes or the like-shaped foods. The machine comprises generally a base 11 having rotatably mounted thereon, a molding plate 12 driven by an electric motor 13, and a hopper 15 for the material to be molded. The machine 10 also comprises mechanism 16 within the hopper for feeding material from hopper to the molding plate, mechanism 17 for removing the molded cakes from the molding plate, and mechanism 18 for adjusting the thickness of the molded cakes.

The base 11 is preferably formed of a casting 20 having a rear vertical wall 21, side vertical walls 22 and 23 and a rear wall 24. Interconnecting said front, rear and side walls is an integral wall portion 25, having a portion 26 extending rearwardly from the front wall 24, substantially semi-circular in transverse cross-section, said portion 26 being interconnected to said rear and side walls by a flat horizontal wall portion 28, and a depressed flat horizontal wall portion 29, disposed in one corner of the base. For the purpose hereinafter stated, the front wall 24 is formed with a substantially cylindrical upwardly and outwardly extending inclined integral portion 30 having a circular opening 31 lying in a plane inclined to the horizontal. A removable screw-threaded oil drain plug 30a may be provided in front fall 24 for removing oil and the like from the chamber formed in the base above wall 25. The rear wall 21 is formed with a horizontal, integral bearing portion 32. Attached to said wall 21, in any suitable manner, is the electric motor 13 having a horizontal rotary central shaft 33 journaled within said bearing 32 and projecting into said base, above the wall portion 29 thereof. A worm 34 is fixed to said shaft 33 for the purpose hereinafter described.

The top of the base 11 may be closed or covered by a member 35 adapted to contact the upper edge of said front, rear and side walls, and attached thereto by screws 36b or in any other suitable manner. The cover member 35 is provided with an opening 35a for the purpose hereinafter stated, and attached to the upper surface of said member adjacent one corner thereof is a member 36 having a plate portion 36a contacting said cover member, and an upstanding tubular portion 37 formed with a vertical tubular opening 38 registering with said opening 35a. Mounted within opening 35a of cover 35 and adjacent the upper end of said tubular portion 37 are a pair of co-axial, preferably ball-bearing members 40 and 41, respectively, and mounted within said bearing members 40 and 41 is a vertical shaft 42 having shoulder portions 43 and 44 engaging said bearings 40, 41, respectively which thus support the shaft and limit downward vertical movement thereof. The shaft 42 is provided with a portion 44a extending downwardly into the base 11, and non-rotatably fixed to said portion 44a is a spur gear 45 having a downwardly extending hub portion 46 formed with a thread for receiving a threaded ring 47. Non-rotatably keyed to said hub 46, and disposed within the ring 47 and the gear 45, is a worm wheel 48 meshing with said worm 35, whereby when the motor 13 is running, the shaft 33, the worm 34, and the shaft 42 with its gears 45 and 48 will be simultaneously rotated. A nut 42a screwed to the lower screw thread end 42b of shaft portion 44a engages the lever end of hub 46 for retaining the gears 45 and 48 and ring 47 on said shaft portion.

It will be noted that upon removal of the nut 42a, said gears 45, 48 and ring 47 may be slipped off the shaft portion 44a, and the shaft 42 may then be lifted out of the tubular portion 37, the shoulders or collars 43, 44 being of suitable dimensions to permit withdrawal of said shaft. A spacing sleeve 42b received on the shaft may be interposed between bearings 40, 41. The shaft 42 further comprises a portion 43a extending upwardly from collar 43, a reduced portion 83 extending upwardly from said portion 43a, a portion 78a of non-circular cross-section extending upwardly from said portion 83, and a flat upper end portion 90 provided with a transverse pin 91 extending to the opposite sides thereof.

The hopper 15 comprises a base or bottom 50 formed with a flat, horizontal, circular portion 51 and an upwardly extending flange 52. The portion 51 is formed with an axial downwardly extending tubular portion 53 received within the upper end of said tubular portion 37, receiving the shaft portion 43a therein, and with an upwardly extending tubular portion 80 receiving the shaft portion 83, a spacer sleeve 82 being interposed between said portion 83 and tubular portion 80. The member 50 may be keyed to said upper end of said tubular portion 37 by means of an outwardly extending pin 54 fixed to said portion 53, and received within a notch 55 in the upper rim edge of said tubular portion 37. A set-screw 56 extending through said tubular portion 37 is adapted to be screwed against said tubular portion 53 for detachably retaining the hopper 15 in position on said tubular portion 37. The bottom wall 51 of the member 50 is formed with an eccentric opening 58 and with a beveled undersurface 58a for the purpose hereinafter described. The hopper 15 further comprises an inner cylindrical wall 60, the bottom end of which is preferably slidably received within the upstanding wall portion 52 of the member 50. A pin 62 fixed to said wall 60, may be received within a notch 63 formed in the upper edge of the wall 52 to prevent relative rotation between said hopper and said member 50. The top of the cylindrical portion 60 of the hopper 15 may be provided with a cover 64 having a downwardly extending rim edge 65 adapted to frictionally engage the upper edge of said cylindrical wall 60. A pin and slot connection 54, 55 serves to properly position the eccentric opening 58 with respect to the molding plate 12.

To provide an ice chamber for the hopper there is attached to the outer surface of said cylindrical wall 60, above the upper edge thereof, an annular member 66 having an outwardly extending portion 67, the inner edge of which may be soldered as at 67a to said wall 60. Extending upwardly from portion 67 is an upwardly extending, substantially cylindrical portion 68 forming with said cylindrical portion 60, a chamber 69 adapted to receive ice, frozen carbon dioxide, or any other refrigerant for material in the hopper. A plurality of interconnecting strengthening rods 70 may be provided for interconnecting the upper ends of the walls 60 and 68. A cover member 71, having a knob or handle, 72, may be provided for the outer member 66, said cover 71 being formed with a downwardly extending rim edge 73 adapted to frictionally engage the upper rim edge 74 of said wall 68. The hopper portion 66 may be provided with a stop cock 66a for draining water and the like from chamber 69. Obviously, if desired, the ice compartment may be omitted from the hopper 15.

The mechanism 16 for feeding the material within the hopper 15 through the openings 58 may comprise a sleeve 77 having a vertical opening 78 preferably of square cross-section for receiving the upper end 78a of said shaft thereon, and a cylindrical vertical opening 79 rotatably receiving the tubular upwardly extending portion of said member 50. It will thus be seen that rotation of the shaft 42 will cause rotation of the sleeve 77. Integrally formed with said sleeve 77, adjacent the bottom end thereof, are a plurality of outwardly extending inclined vanes or blades 87 adapted to press the plastic or other materials within the hopper, downwardly through the opening 58 during operation of the machine. A pair of inclined vanes 88 may be integrally formed with the sleeve 77 somewhat above the vanes 87, for pressing the material downwardly within the hopper to prevent formation of air pockets therein. A radial inwardly extending member 89 fixed at the outer end thereof to the cylindrical wall 60, and disposed between the lower vanes 87 and the upper vanes 88, serves to prevent rotation of the plastic material, as a whole, within the hopper.

Figures 3, 4, 6:
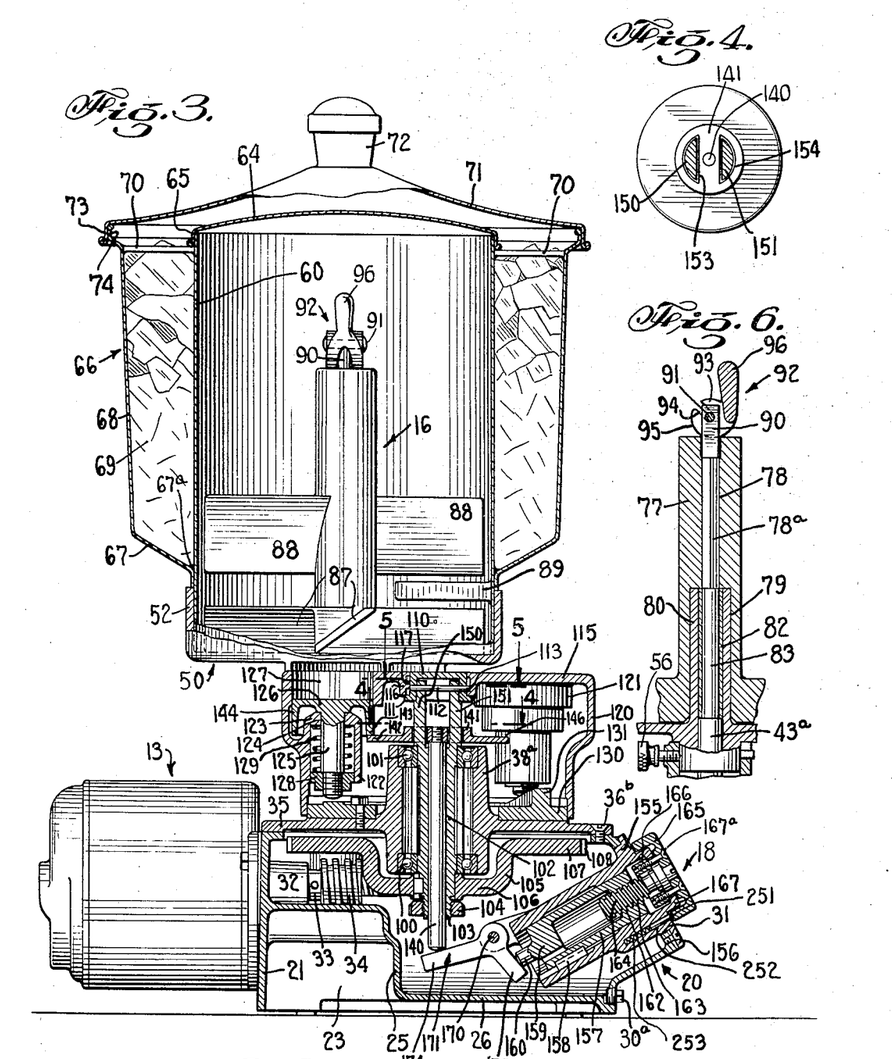
Fig. 3 is a cross-sectional view taken on line 3—3 of Fig. 2.
Fig. 4 is a cross-sectional view taken on line 4—4 of Fig. 3.
Fig. 6 is a fragmentary elevational, cross-sectional view of the feeding mechanism within the hopper and the mounting therefor.
Figure 5:
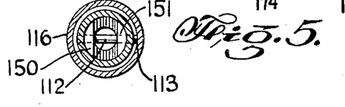
Fig. 5 is a cross-sectional view taken on line 5—5 of Fig. 3.
Figure 7:
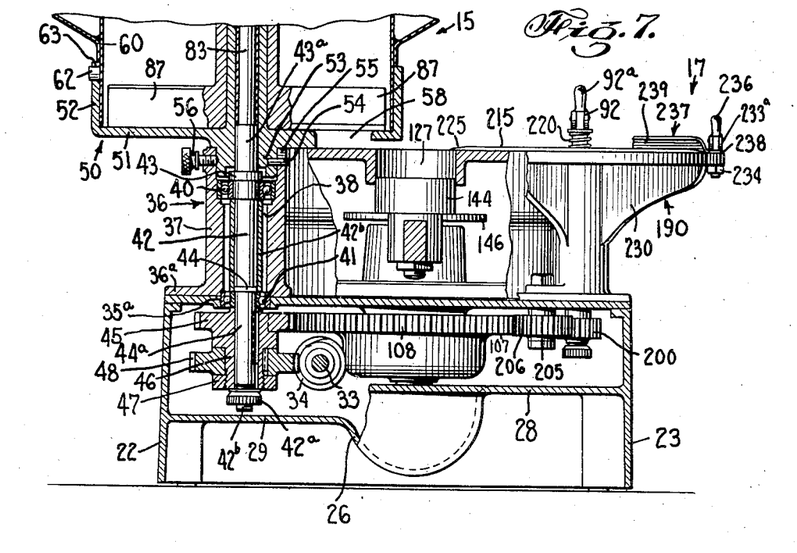
Fig. 7 is a cross-sectional view taken on line 7—7 of Fig. 2.
Figure 8:
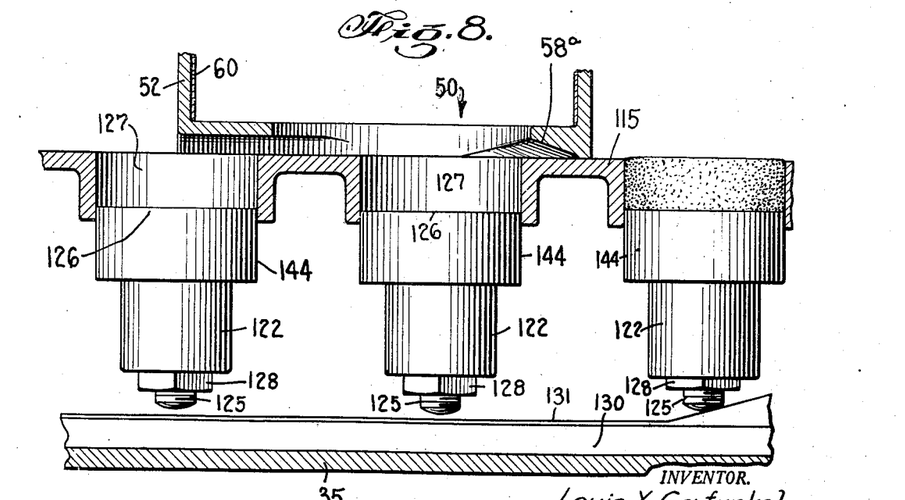
Fig. 8 is a sectional, developed view taken on line 8—8 of Fig. 2.

Means is provided for removably retaining the sleeve 77 on the upper end of the shaft. To this end, there is fixed to the upper end portion 90 of the shaft, a transverse pin 91 projecting on opposite of said end portion. There is further provided a member 92 having a handle portion 96 and a pair of bifurcated parallel cammed arm portions 93, integrally formed with said handle portion and adapted to receive said flat end portion 90 of the shaft therebetween, said arms having aligned radial slots receiving the outer ends of said pin 91. Rotation of the handle 96 in one direction will cause the cammed surfaces 95 of the arms 93 to press downwardly on the upper end of sleeve 77 for firmly fixing the sleeve to the shaft. Rotation of the handle 96, however, in a counter clockwise direction, looking at Fig. 6, will bring the shallower portions of the cammed surface 95 into contact with the upper end of the sleeve 77, whereby the member 92 will become loose to permit withdrawal thereof from the pin 91. It will thus be seen that for attaching the sleeve 77 to the shaft, it is merely necessary to place said sleeve over the shaft so that the square portion 78a of the latter will enter the opening 78. The member 92 may then be applied by engaging the pin ends of the pin 91 within the slots 94, and turning the member 92 in a clock-wise direction, looking at Fig. 6. This operation will cause the high portions of the cammed edges 95 to engage the top end of the sleeve 77, the lower portions of arms 93 thus serving as a wedge for tightly pressing the sleeve 77 downwardly and to prevent looseness between the member 92 and said sleeve.

For supporting the molding plate 12, the top cover 35 may further be provided with an upwardly and downwardly extending vertical, centrally disposed, tubular portion 38a. Mounted within the upper and lower ends of said portion 38a, are a pair of spaced ball-bearings 100 and 101, supporting a vertical tubular shaft 102, the latter having a shoulder engaging the upper bearing. Said tubular shaft 102 is provided with a screw-threaded lower end portion 103 receiving a nut 104. Fixed to said shaft 102 for rotation therewith, is a gear member 105 having a central cup-shaped portion 106 formed with an opening for said shaft and supported by said nut 104, and a flat horizontal portion 107 provided with peripheral gear teeth 108 meshing with the teeth of gear 45, whereby shaft 102 may be driven through gears 45, 105 by the motor 13.

Means is provided at the upper end of the shaft 102 for supporting the molding plate 12. To this end, the shaft is formed with a pair of upwardly extending spaced arms 150, 151 and fitted over the upper ends of said arms is an annular cap 110 having an outwardly extending flange 111. A diametrical pin 112 extending through said arms 150, 151 and cap 110, serves to fix said cap to said arms. Said pin 112 is provided with an extension 113 on one side thereof only, extending beyond the outer cylindrical surface of said cap 110. The molding plate 12 comprises a top horizontal wall 115 having a central downwardly extending tubular portion or flange 116, somewhat greater in diameter than the outer diameter of the cylindrical portion of the cap 110. Formed on the inner surface, however, of said tubular portion 116, is a helical steep pitched thread 117 adapted to engage extension 113 of pin 112 for detachably fixing the molding plate 12 to the cap 110. To effect the attachment, the molding plate is placed over the cap 110 in such position that the extension 113 of the pin 112 will enter within the tubular portion 116. Rotation of the molding plate 12 through about 180 degrees, however, will cause the pin to engage the upper surface of the helical thread 117 for pressing the lower end of the tubular portion 116 against the upper surface of the flange 111. The plate 112 may thus be readily mounted on the shaft 102 and may be readily removed therefrom by merely rotating the plate backwards to disengage the pin end 113 from the thread 117. The direction of the thread 117 is preferably such that during rotation of the shaft 102, when the machine is in operation, the pin end 113 will tend to more tightly wedge the threaded portion 117 against the cap flange 111. The pin 112 and the thread 117 thus constitute bayonet connection means, wedging means or cammed means for attaching the molding plate to the supporting shaft 102.

The molding plate 12 is preferably provided with a downwardly projecting skirt portion 120 extending from the top portion 115 thereof, and substantially to the level of the cover plate 35 to form a housing or chamber. The top wall portion 115 of the molding plate 12 is further provided with a plurality of equiangularly spaced downwardly extending, integrally formed tubular mold portions 121 for forming the cakes. Integrally formed with the side wall 120 of the molding plate 12, are a plurality of tubular portions 122 aligned with the molds 121, each open at the bottom and formed with a top wall 123 having an axial opening 124. Slidably mounted within each opening 124 is a piston rod 125 at the upper end of which is formed a piston 126 provided with a downwardly extending cylindrical skirted flange slidably received within one of said mold openings 127. The piston rod 125 may be threaded at the lower end thereof for receiving a nut 128. A coil compression spring 129 may be interposed between each nut 128 and the top wall 123 for normally pressing the piston 126 downwardly. As the molding plate is rotated the mold openings 127 are adapted to pass beneath the opening 58 of the hopper so that the plastic or comminuted material may be fed through said opening 58 by mechanism 16 to the mold openings.

Means is provided to lift the pistons 126, as the molding plate is rotated, for ejecting the formed cakes. To this end, there is attached to the top surface of the cover member 35 an annular ring or plate 130 having an upwardly extending, integrally formed circular cammed portion 131 adapted to be contacted by the lower ends of the piston rods 125. Obviously, the cammed portion begins at a point after the mold openings pass the openings 58, so that the fully molded cakes may be ejected. The pistons are further adapted to ride downwardly on the cam under the influence of the springs 129 so as to be in lowered position when again passing beneath the opening 58 of the hopper bottom 50.

Means is provided for adjustably limiting the downward movement of the pistons 126 whereby the thickness of the formed cakes may be adjusted. To this end, there is slidably mounted within the axial opening of the tubular member 102, a rod 140, and screwed to the upper end of said rod 140 is a flat annular plate 141, the outer edge 142 whereof is adapted to engage the lower edge 143 of the downwardly skirted portions 144 of the pistons 126. Thus, as the molding plate 12 is rotated, the springs 129 will keep the pistons 126 in contact with the cam and lower said pistons after ejecting the molded cakes. The distance which the pistons move downwardly, however, is limited due to contact with the outer edge 146 of the plate 141. It will be noted that the plate 141 is provided with openings 153 and 154 to receive the bifurcated arms 150, 151 of the tubular member 102.

The mechanism 18 for adjusting the height of the rod 140 comprises a tubular member 155 slidably received within the opening 31 of base portion 30, and extending from said member 155 is a flange 156 contacting the outer edge of the said portion 30 and attached thereto by screws or in any other suitable manner. It will be noted that the tubular member 155 is inclined to the horizontal, and extends inwardly into the base and is disposed above the curved wall portion 26 of said base. Slidably mounted within said tubular member 155, is a member 157 keyed as at 158 to said tubular member 155 for sliding movement therewith. The member 157 is provided with an inner end wall 159 from which there projects a pin 160 for the purpose hereinafter described. Said member 157 is provided at the outer end thereof with an end wall 162 formed with an internal, steep pitched helical screw-threaded portion 163. Received within said screw-threaded opening 163 is a screw member 164. Fixed to the outer end of said screw-threaded member 164 by screws 167a or in any other suitable manner, is an outer handle, knob, or dial portion 165 and an inner flange 166 contacting the inner surfaces, of a inwardly extending flange 167, integrally formed with said member 155. The screw-threaded member 164 is thus retained against inward and outward sliding movement with respect to said tubular member 155. Rotation of the handle 165, however, will cause rotation of the screw-threaded member 164 and hence sliding movement of the member 157 inwardly or outwardly, depending upon the direction of rotation of said handle 165.

Pivotally mounted in any suitable manner, within the chamber formed above the curved wall portion 26 of the base, on a horizontal pin 170 located adjacent the inner end of the tubular member 155, is a rocking lever 171 having an arm 172 adapted to contact the inner ends of the pin 160. The lever 171 is further provided with an arm 174 adapted to contact the underside of the rod 140 which projects below tubular member 102 for this purpose. It will thus be seen that rotation of the handle 165 will cause the lever 171 to rotate for lifting the rod 140, and hence shortening the distance which the pistons 126 may be lowered, thus decreasing the thickness of the molded cakes. Rotation of the handle 165 in the opposite direction will permit the springs 129 to push the pistons 126 down, since the rod 140 may then move downwardly as the member 159 is retracted. The flange 156 may be formed with a mark 180, and the handle 165 may be formed with indicia 181 registering with the mark 180 and indicating the number of cakes which may be molded per pound of plastic material or food, said number of cakes being dependent upon the thickness thereof. A pin 251 slidably mounted in an elongated opening 252 formed in member 155, is pressed against an inner surface of dial or knob 165 by a spring 253 within said opening. Said surface of said knob may be formed with spaced sockets aligned with indicia 181 adapted to receive the end of the pin, whereby the knob will be retained in any position to which the same may be turned and to bring each number of the indicia 181 in registration with mark 180.

The machine may be further provided with a time switch mechanism 182 of any suitable construction, so that the motor may be run for any desired time before being automatically stopped. Thus, if the speed of the motor is such that a definite number of cakes may be molded per given unit of time, regulation of the time switch will predetermine the number of cakes which may be molded at a time. Thus, for molding any desired number of cakes in one operation of the machine, the time switch need merely be set for the proper time, and then the motor started, the switch serving to automatically stop the motor at the expiration of the time set. The time switch may, of course, be of any well known construction.

The means 17 for removing the cakes from the molding plate 12 comprises a casting 190 having a plate portion 191 resting on the top surface of the cover 35, adjacent one corner of the base 11 and attached to said cover by means of bolts 192, or in any other suitable manner. Extending upwardly from said plate portion 191 is a tubular portion 193, whereof the top surface 194 is preferably of substantially the same level as the top surface of the molding plate 12. The cover member 35 is formed with an opening 195 aligned with tubular portion 193, for receiving a ball bearing 196. Mounted adjacent the upper end 194 of the tubular member 193 is a second ball-bearing 197 aligned with bearing 195. Rotatably mounted within said bearing members 195, 197, is a vertical, rotatable shaft 198 preferably having suitable shoulder portions for contacting said bearings.

Keyed to the lower end of said shaft 198 is a small spur gear 200, retained on said shaft by means of a nut 201 screwed to the lower screw-threaded end 202 of said shaft. Rotatably mounted on a shaft 205, fixed at the upper end thereof to the plate portion 191 and extending through suitable aligned openings in the cover 35 and portion 191, is a spur gear 206 meshing with the teeth 108 of gear 107 and with the teeth of the spur gear 200. The shaft 205 may be formed with a head at the lower end thereof for supporting the gear 206. The shaft 198 is thus driven by the motor 13 through the shaft 33, worm 34, gear 48, and gears 45, 107, and 206. The shaft 198 is provided at the upper end thereof with an annular flange 210, the upper surface of which is substantially in the level of the upper surface 194 of the tubular portion 193. Extending upwardly from said flange portion 210 is a reduced shaft portion 211 from which there extends a flat, upward projection 212 for the purpose hereinafter explained.

Mounted on the shaft 198 is a flat, circular disc 215 having a central opening 216 receiving the shaft portion 211 therethrough. An eccentric pin 217 projecting upwardly from the flange 210 extends through an opening 218 in said disc, for fixing said disc for rotation with said shaft. A washer 219 formed with a suitable opening receiving the extension 212 therethrough, is adapted to rest on the shoulder formed at the upper end of the shaft portion 211. A coil compression spring 220 is interposed between the washer 219 and the upper surface of the disc 215, a washer 221 preferably being interposed between the lower end of said spring and the upper surface of said disc. For fixing said washer 219 to the shaft 198, said extension 212 is provided with a transverse pin 222, fixed thereto and extending to the opposite sides thereof. A member 92a likewise provided with bifurcated slotted arms, is adapted to receive the outer ends of the transverse pin 222, and is also provided with a cammed under surface adapted to engage the upper surface of the washer 219, whereby rotation of said member 92a will prevent removal of said washer, and the spring 220 will press the disc downward on the flange 210. The disc 215 is provided with a downwardly beveled peripheral edge 225 adapted to substantially contact the upper surface of the molding plate. It will be noted that the disc 215 rotates in the same direction as the molding plate. The ejected cakes will be carried onto the disc 215 which undercuts the ejected cakes and removes them from the molding plate. Due to the rotation of the disc, the cakes will be carried off the plate and will then be automatically thrown off the disc by centrifugal force into any suitable receptacle or tray provided for receiving the cakes.

Figure 1:
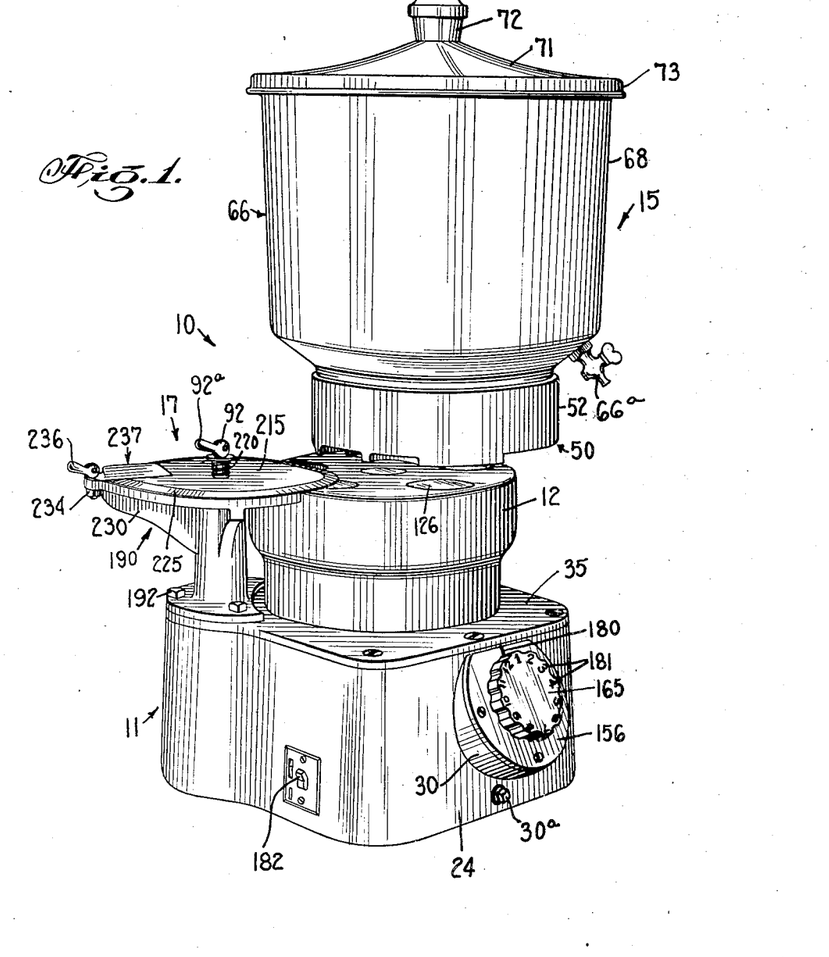
Fig. 1 is a perspective view of a shaping or molding machine embodying the invention.
Figure 2:
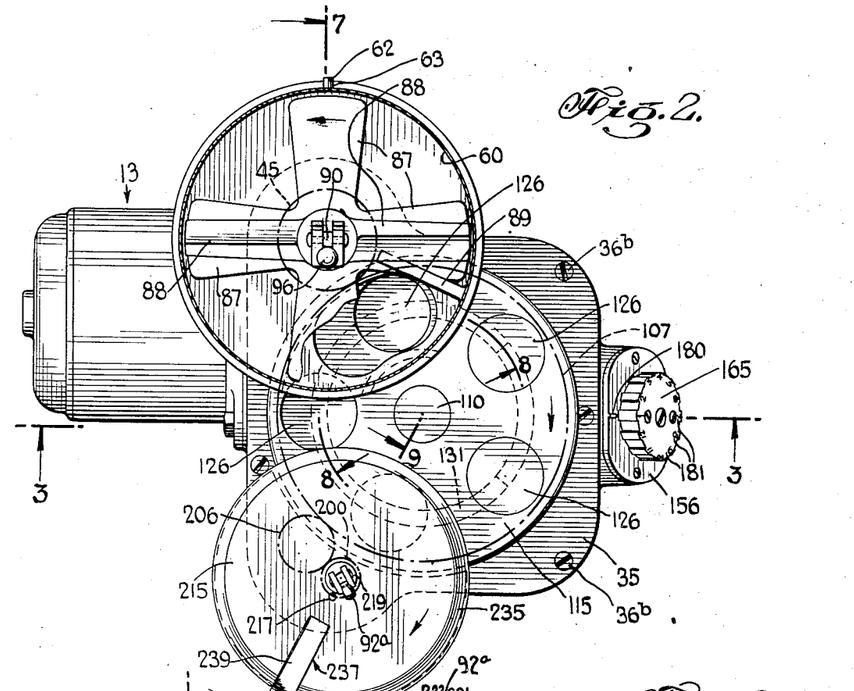
Fig. 2 is a top plan view of the machine shown in Fig. 1.
Figures 9, 10:
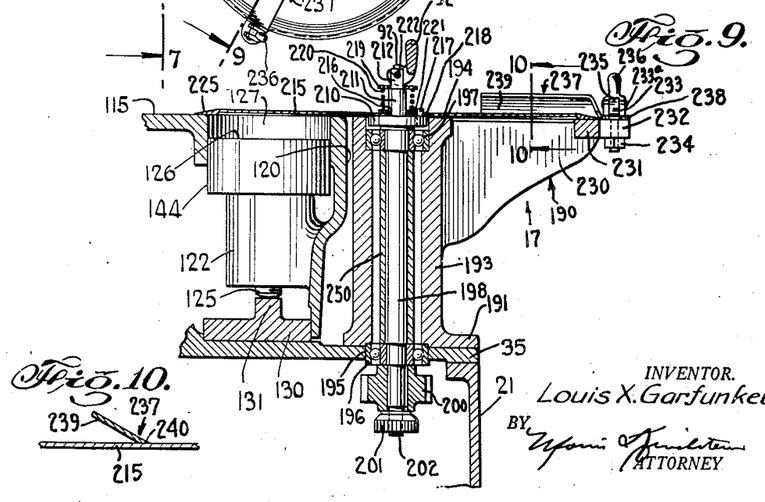
Fig. 9 is a cross-sectional view taken on line 9—9 of Fig. 2.
Fig. 10 is a cross-sectional view taken on line 10—10 of Fig. 9.

Obviously the disc 215 overlaps the molding plate as shown in Figs. 2 and 9. For protecting the outer edge of the portion of the disc which does not overlap the molding plate, there is integrally formed with said tubular portion 193, a plurality of radially extending portions 230 interconnected by an annular integral portion 231 adapted to underlie the outer peripheral edge of the disc. It will thus be seen that the disc is effectively guarded by the member 231 so as to prevent the operator from cutting his hands while the motor is running.

For scraping the upper surface of the disc 215 to keep the same clean, the peripheral portion 231 is formed with an integrally outwardly extending portion 232 having a vertical opening receiving a member 233, to the lower end of which there is screwed a nut 234. The upper end 235 of the member 233 is in the form of an eye through which there extends a pin 233a. A member 236 similar in construction to the members 92 and 92a receives the outer ends of the pin and is adapted to attach to said extension 232, a scraping member 237 formed in the manner hereinafter described. Said member 237 is provided with a flat extension 238 contacting the upper surface of the extension 232 and formed with an opening receiving the member 233 therethrough. Extending from said portion 238 of the member 237, is a portion 239 in the form of a knife, inclined to the surface of the disc and having a sharp edge portion 240 resiliently pressing down against the upper surface of the disc 215. The member 237 is preferably made of spring metal for yieldably pressing down against the disc 215. It will thus be seen that the member 237 is adapted to remove bits of food or the like material from the disc, to maintain the same clean.

An elongated spacer member 250 receiving the shaft therethrough may be interposed between the bearing members 196 and 197.

The operation of the machine will now be clear. The plastic material is put into the hopper portion 60, and ice or the like refrigerants may be placed within the compartment 69. The covers 64 and 71 are then placed in position, and the motor started. The motor will cause rotation through the worm 34 and the worm wheel 48, of the shaft 42 and the feeding mechanism 16. The motor will also cause simultaneous rotation of the molding plate through the spur gear 45 and the gear 105, fixed to the tubular member 102 on which the molding plate is mounted. During operation of the molding plate, the pistons will be automatically reciprocated within the mold openings by means of cam 131 and springs 129. The plastic material fed through the opening 58 will be gradually pressed into the mold openings by means of the beveled or inclined undersurface 58a of the hopper bottom 50. The formed cakes will be ejected by the lifting action of the cam 131 and the ejected cakes will be removed by the rotating disc 215. The thickness of the cakes may be adjusted to produce any desired number of cakes per pound of plastic material used by means of the rotatable knob or dial 165. If desired, the time switch may be set to operate the motor for a predetermined length of time to produce a predetermined number of cakes in one operation of the machine.

It will be noted that the device may be quickly and readily assembled or disassembled. In assembling, the mechanism 18 may be separately assembled and merely fitted into the opening 31 and attached to the portion 30 of the base. The rocking lever 171 may likewise be readily mounted within the base prior to attachment of the mechanism 18. The motor 13 may then be attached to the base to bring the shaft portion 33 thereof within the bearing opening 32 of the base and the worm wheel 34 may then be fixed onto said shaft 33.

The tubular shaft 102 may then be fitted into the bearings 100 and 101 from the top of the base, said shaft having a shoulder adapted to contact the upper bearing. The gear 105 may then be fitted onto the tubular member 102 from the bottom end thereof, and the nut 104 applied for fixing said gear 105 to said tubular member 102 from the bottom end thereof, and the nut 104 applied for fixing said gear 105 to said tubular member. The plate 141 with its rod 140 may then be fitted in place to bring said rod within the tubular opening of said tubular shaft 102, to the bifurcated arms 150 and 151 passing through the openings 153 and 154 of said plate.

The member 36 may then be attached to the cover plate and the shaft 42 then inserted into the tubular portion 37 of said member 36, said shaft being formed with shoulders contacting the bearing members 40 and 41 which support the same. The gear member 45 may be assembled with gear 48 and ring 47 and the assembly fitted onto the lower end 44a of the shaft. The nut 42a may then be screwed to the screw-threaded end 42b of the shaft portion 44a for fixing the gears 45 and 48 to said shaft portion. The cam plate 130 may then be fixed to the top of the cover member 35 in suitable position. The casting 190 may then be attached to the top of the cover in suitable position and the shaft 198 inserted downwardly into the bearings 194, 195, said shaft being likewise provided with suitable shoulders contacting the bearings which support the same. The gear 200 may then be fitted onto the lower end 199 of the shaft and the nut 201 screwed to the screw-threaded end 202 for fixing the gear 200 to said shaft portion 199. The shaft 205 with its gear 206 may then be attached to the cover 35 and plate portion 191 of the casting 190 so that said gear will mesh with gears 105 and 200. The cover plate may then be attached to the top of the base 11 in suitable position so as to bring the worm wheel 48 in mesh with the worm 34 and the spur gear in mesh with the teeth of the gear 105. The molding plate 12 may then be attached to the upper end of the bifurcated arms 150 and 151 in the manner described above. It will be noted that the hopper plate may be quickly attached by a simple turning movement to bring the pin end 113 within the groove formed by the screw-threaded portion 117 of the tubular downwardly extending flange 116. The hopper 15 may then be mounted on the top of the tubular portion 37 by means of the set-screw 56 and pin 54. The member 77 may then be fitted on the top of the shaft and for receiving the upwardly projecting portion 80 of the hopper bottom 50 in the manner described above. The member 92 may then be applied for fixing the feeding mechanism to the shaft. The disc 215 may then be fitted on the upper end of the shaft 198 and the spring 220 and washers 219 and 221 applied in the manner described above, the member 92a serving to retain the disc on said shaft. The scraping or cleaning member 237 may then be applied as hereinbefore described.

It will be noted that the feeding mechanism may be quickly removed by simply removing the top 92 and lifting said feeding mechanism upwardly. Also the hopper may be readily removed by merely loosening the set-screw 56. The member 92 also serves to retain the hopper in mounted position on the tubular portion 37, the set-screw serving as an attachment when member 92 is removed. The shafts 42 and 198 may also be removed by merely lifting said shafts upwardly. Also the tubular shaft 102 may likewise be removed by merely lifting the same upwardly. It will thus be seen that the entire machine may be quickly and readily assembled or disassembled and that the hopper with the feeding mechanism may be removed as a unit for placing in a proper refrigerator if desired.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings, is to be interpreted as illustrative and not in a limiting sense.

Having thus described my invention, I claim as new and desire to secure by Letters Patent:

1. In a molding machine, in combination, a rotary molding plate having a plurality of parallel angularly spaced mold openings therein, a piston slidably mounted within each opening, cammed means for moving said pistons to eject the cakes formed within said mold openings, spring means for retracting said pistons, and means for limiting the retractile movement of said pistons, said means comprising an annular ring having a central stem, a rock lever pivotally mounted on said base and having an arm contacting the underside of said stem, a member slidably mounted on said base and adapted to engage the other arm of said rocking lever, and a member rotatably and non-slidably mounted on said base having a screw-threaded engagement with said slidably mounted member.

2. In a molding machine, a base, a vertical shaft rotatably mounted therein, means for rotating said shaft, a molding plate having an opening for receiving the upper end of said shaft, and bayonet connection means on said molding plate at said opening and at the upper end of said shaft, adapted to coact for detachably attaching said molding plate to said shaft.

3. In a machine of the character described, a base, a shaft rotatably mounted thereon, said shaft being provided at the upper end thereof with an outwardly extending annular flange, a pin projecting from one side thereof and spaced from said flange, and a rotary molding plate having a central tubular portion adapted to receive the end of said shaft, the inner end of said tubular portion being adapted to contact said flange, and means on said tubular portion adapted to cooperate with said pin for detachably attaching said molding plate to said shaft.

4. In a machine, a rotary molding plate having a plurality of mold openings therein, means for feeding plastic material to said openings, means for ejecting the cakes molded within said mold openings, and means for removing said molded cakes from said rotary plate, said means comprising a disc adapted to overlap and substantially lie against said molding plate, and means for rotating said disc and plate, said disc having a downwardly beveled outer edge portion for undercutting said cakes.

5. In a molding machine, a molding plate having a plurality of angularly spaced openings therein, means for feeding comminuted material to said openings, means for ejecting the cakes formed within said mold openings, means for removing the ejected cakes from said molding plate, said means comprising a fixed member, a rotary disc mounted on said member, said disc partially overlapping and substantially contacting the top surface of said molding plate, said fixed member having a portion underlying the portion of the edge of said disc extending beyond said molding plate, and a member detachably fixed to said fixed member adapted to resiliently press against the upper surface of said disc for removing substances adhering to said disc.

6. A machine of the character described comprising a base, a vertical shaft mounted thereon, means for rotating said shaft, a hopper mounted on said base having a bottom portion and central tubular portion receiving said shaft therethrough, and extending upwardly from said bottom portion, and a sleeve slidably and non-rotatably mounted on the upper end of said shaft, and rotatably receiving said tubular portion of said hopper, and one or more inclined vanes integrally formed with said sleeve, a transverse pin at the upper end of said shaft, and a member engaging said pin adapted to press down against the upper end of said sleeve for retainig said sleeve on said shaft.

7. A machine for molding plastic material comprising a base having a tubular portion formed with a bearing, a vertical shaft rotatably mounted within said bearing, a hopper comprising a member having a horizontal portion, and a cylindrical portion extending upwardly from the outer edge of said horizontal portion, said horizontal portion being formed with an eccentric opening, said member being formed with an upwardly extending tubular portion and downwardly extending tubular portion, said tubular portions being formed with a central opening rotatably receiving said shaft therethrough, said downwardly extending tubular portion telescoping with the tubular portion of said base, a pin and slot connection between said telescoping portions, said shaft projecting above said upwardly extending tubular portion, a sleeve mounted on said last mentioned portion of said shaft, and having a tubular opening rotatably receiving said upwardly extending tubular portion through said member.

8. A machine for molding plastic material comprising a base having a tubular portion formed with a bearing, a vertical shaft rotatably mounted within said bearing, a hopper comprising a member having a horizontal portion, and a cylindrical portion extending upwardly from the outer edge of said horizontal portion, said horizontal portion being formed with an eccentric opening, said member being formed with an upwardly extending tubular portion and downwardly extending tubular portion, said tubular portions being formed with a central opening rotatably receiving said shaft therethrough, said downwardly extending tubular portion telescoping with the tubular portion of said base, a pin and slot connection between said telescoping portions, said shaft projecting above said upwardly extending tubular portion, a sleeve mounted on said last mentioned portion of said shaft, and having a tubular opening rotatably receiving said upwardly extending tubular portion through said member, said shaft having an upper end projecting above the upper end of said sleeve, a transverse pin fixed to said upper end of said shaft, and a slotted member having a cammed surface receiving said pin within said slot and adapted to press down against the upper end of said sleeve, and a plurality of radially extending inclined vanes on said sleeve for feeding material within said hopper to said eccentric opening.

9. A machine for molding plastic material comprising a base having a tubular portion formed with a bearing, a vertical shaft rotatably mounted within said bearing, a hopper comprising a member having a horizontal portion, and a cylindrical portion extending upwardly from the outer edge of said horizontal portion, said horizontal portion being formed with an eccentric opening, said member being formed with an upwardly extending tubular portion and downwardly extending tubular portion, said tubular portions being formed with a central opening rotatably receiving said shaft therethrough, said downwardly extending tubular portion telescoping with the tubular portion of said base, a pin and slot connection between said telescoping portions, said shaft projecting above said upwardly extending tubular portion, a sleeve mounted on said last mentioned portion of said shaft, and having a tubular opening rotatably receiving said upwardly extending tubular portion through said member, said shaft having an upper end projecting above the upper end of said sleeve, a transverse pin fixed to said upper end of said shaft, a slotted member having a cammed surface receiving said pin within said slot and adapted to press it down against the upper end of said sleeve, a plurality of radially extending inclined vanes on said sleeve for feeding material within said hopper to said eccentric opening, said hopper further comprising a member mounted on said first member having a cylindrical portion engaging the cylindrical wall of said first member, and an annular wall concentric with said cylindrical portion and forming a compartment therewith.

10. A machine for molding plastic material comprising a base having a tubular portion formed with a bearing, a vertical shaft rotatably mounted within said bearing, a hopper comprising a member having a horizontal portion, and a cylindrical portion extending upwardly from the outer edge of said horizontal portion, said horizontal portion being formed with an eccentric opening, said member being formed with an upwardly extending tubular portion and downwardly extending tubular portion, said tubular portions being formed with a central opening rotatably receiving said shaft therethrough, said downwardly extending tubular portion telescoping with the tubular portion of said base, a pin and slot connection between said telescoping portions, said shaft projecting above said upwardly extending tubular portion, a sleeve mounted on said last mentioned portion of said shaft, and having a tubular opening rotatably receiving said upwardly extending tubular portion through said member, said shaft having an upper end projecting above the upper end of said sleeve, a transverse pin fixed to said upper end of said shaft, a slotted member having a cammed surface receiving said pin within said slot and adapted to press it down against the upper end of said sleeve, a plurality of radially extending inclined vanes on said sleeve for feeding material within said hopper to said eccentric opening, said hopper further comprising a member mounted on said first member having a cylindrical portion engaging the cylindrical wall of said first member, and an annular wall concentric with said cylindrical portion and forming a compartment therewith, a cover for the upper end of said cylindrical portion of said second member, and a cover for the upper end of said annular wall overlying said first cover.

11. A molding machine comprising a base having a horizontal wall formed with a bearing, a vertical shaft rotatably mounted within said bearing, a gear received on the lower end of said shaft and keyed thereto disposed below said horizontal wall and contacting the underside of said bearing, and a rotary molding plate formed with a plurality of spaced mold openings detachably attached to the upper end of said shaft and disposed above said horizontal wall, said shaft being formed with a shoulder contacting the upper side of said bearing whereby said shaft may be supported on said base, a second vertical shaft rotatably mounted on said base, a hopper mounted on said base having an opening receiving the upper end of said second shaft and a gear on said second shaft meshing with said first gear.

12. A molding machine comprising a base having a horizontal wall formed with a bearing, a vertical shaft rotatably mounted within said bearing, a gear fixed to said shaft and disposed below said horizontal wall, and a rotary molding plate formed with a plurality of spaced mold openings detachably attached to the upper end of said shaft and disposed above said horizontal wall, a plurality of pistons slidably mounted within said mold openings, said shaft being formed with a central tubular opening, a stem slidably mounted within said tubular opening, and a plate fixed to the upper end of said stem adapted to engage said pistons.

13. A molding machine comprising a base having a horizontal wall formed with a bearing, a vertical shaft rotatably mounted within said bearing, a gear fixed to said shaft and disposed below said horizontal wall, and a rotary molding plate formed with a plurality of spaced mold openings detachably attached to the upper end of said shaft and disposed above said horizontal wall, a plurality of pistons slidably mounted within said mold openings, said shaft being formed with a central tubular opening, a stem slidably mounted within said tubular opening, and a plate fixed to the upper end of said stem adapted to engage said pistons, and means for lifting said stem for limiting the downward movement of said pistons.

14. In a machine of the character described, a base having a horizontal wall portion formed with a bearing, a rotary molding plate having a top wall portion and a downwardly extending skirt portion, said top wall portion being provided with a central opening receiving the upper end of said shaft, said molding plate having a plurality of integral cylindrical portions forming mold openings, pistons slidably mounted within said mold openings, said pistons having downwardly extending stems, a cam mounted on the upper surface of said horizontal wall, said skirted portion of the molding plate being adapted to house said cam, said cam being adapted to contact the lower ends of said stems as said molding plate is rotated for lifting said pistons.

15. In a machine of the character described, a base having a horizontal wall portion formed with a bearing, a rotary molding plate having a top wall portion and a downwardly extending skirt portion, said top wall portion being provided with a central opening receiving the upper end of said shaft, said molding plate having a plurality of integral cylindrical portions forming mold openings, pistons slidably mounted in said openings and having downwardly extending stems, a cam mounted on the upper surface of said horizontal wall adapted to contact the lower ends of said stems as said molding plate is rotated for lifting said pistons, said molding plate being provided with integral cylindrical portions coaxial with said first named cylindrical portions and having top walls formed with openings for slidably receiving said stems, said stems being provided with screw threaded lower end portions, nuts screwed to said screw threaded portions of said stems and slidably received within said second named cylindrical portions, and a spring received on each stem interposed between the nuts and said walls of said second named cylindrical portion.

16. In a machine of the character described, a base having a horizontal wall formed with a bearing, a vertical tubular shaft mounted within said bearing, a rotary molding member detachably attached to the upper end of said shaft, said member having a plurality of mold openings, pistons slidably mounted within said mold openings, a cam member mounted on said horizontal plate adapted to lift said piston, a stem slidably mounted within the tubular opening in said tubular shaft, a plate attached to the upper end of said stem adapted to be contacted by said pistons, and means for lifting said stem for limiting the strokes of said pistons.

17. In a machine of the character described, a base having a horizontal wall formed with a bearing, a vertical tubular shaft mounted within said bearing, a rotary molding member detachably attached to the upper end of said shaft, said member having a plurality of mold openings, pistons slidably mounted within said mold openings, a cam member mounted on said horizontal plate adapted to lift said pistons, a stem slidably mounted within the tubular opening in said tubular shaft, a plate attached to the upper end of said stem adapted to be contacted by said pistons, and means for limiting the strokes of said pistons, said means comprising a lever having an arm engaging the underside of said stem, and means for pivotally moving said lever.

18. In a machine of the character described, a base having a horizontal wall formed with a bearing, a vertical tubular shaft mounted within said bearing, a rotary molding member detachably attached to the upper end of said shaft, said member having a plurality of mold openings, pistons slidably mounted within said mold openings, a cam member mounted on said horizontal plate adapted to lift said pistons, a stem slidably mounted within the tubular opening in said tubular shaft, a plate attached to the upper end of said stem adapted to be contacted by said pistons, means for limiting the strokes of said pistons, said means comprising a lever having an arm engaging the underside of said stem, and means for pivotally moving said lever, said last named means comprising a tubular member on said base, a member slidably and non-rotatably mounted within said tubular member, and engaging said lever, and a member rotatably and non-slidably mounted on said tubular member having a screw threaded connection with said slidably and non-rotatably mounted member.

19. In a machine of the character described, a base having a horizontal wall formed with a bearing, a vertical tubular shaft mounted within said bearing, a rotary molding member detachably attached to the upper end of said shaft, said member having a plurality of mold openings, pistons slidably mounted within said mold openings, a cam member mounted on said horizontal plate adapted to lift said pistons, a stem slidably mounted within the tubular opening in said tubular shaft, a plate attached to the upper end of said stem adapted to be contacted by said pistons, and means for limiting the strokes of said pistons, said means comprising a lever having an arm engaging the underside of said stem, and means for pivotally moving said lever, said last named means comprising a tubular member on said base, a member slidably and non-rotatably mounted within said tubular member, and engaging said lever, and a member rotatably and non-slidably mounted on said tubular member having a screw threaded connection with said slidably and non-rotatably mounted member, and resilient means for retaining said rotatably and nonslidably mounted member in any position to which the same may be turned.

20. In combination with a rotary molding plate having a plurality of angularly spaced mold openings, means for feeding material to said mold openings, a piston slidably mounted within each opening, cam means for lifting the pistons to eject the molded material from said openings, means for limiting the strokes of said pistons, comprising an annular member adapted to be contacted by said pistons during rotation of said plate, said annular member being provided with a central stem, and means for lifting and lowering said stem.

21. In combination with a rotary molding plate having a plurality of angularly spaced mold openings, means for feeding material to said mold openings, a piston slidably mounted within each opening, cam means for lifting the pistons to eject the molded material from said openings, means for limiting the strokes of said pistons, comprising an annular member adapted to be contacted by said pistons during rotation of said plate, said annular member being provided with a central stem, and means for lifting and lowering said stem, said means comprising a member engaging said stem and a screw threaded member, adapted to actuate the former member upon turning said latter member.

22. A machine for molding cakes from plastic material comprising a rotary molding member having a plurality of mold openings therein, pistons slidably mounted within said mold openings, means for feeding plastic material to said mold openings to form cakes, means for ejecting said molded cakes, means for adjusting the thickness of the molded cakes, means for indicating the thickness of the cakes to be molded and time controlled means for automatically stopping the operation of the machine when a predetermined number of cakes have been molded.

23. A machine for molding cakes comprising a base, a rotary molding member mounted on said base and having a plurality of mold openings, pistons, slidably mounted within said openings, means for feeding plastic material to said mold openings to form cakes, means for rotating said molding member, means for lifting said piston as the molding member is rotated for ejecting said formed cakes, means spaced from said lifting means for adjusting the thickness of the cakes, comprising a member rotatably mounted on said base, and means associated with said member for indicating the thickness of the cakes to be molded.

In testimony whereof I affix my signature.

LOUIS X. GARFUNKEL.